+50-60
10/7/86

United States Patent [19]

Kasper et al.

[11] E Patent Number: Re. 32,259

[45] Reissued Date of Patent: Oct. 7, 1986

[54] METHOD AND MEANS FOR IMPROVING MAXIMUM DENSITY AND TONAL RANGE OF ELECTROGRAPHIC IMAGES

[75] Inventors: George P. Kasper; Arthur S. Kroll; Michael Mosehauer, all of Rochester, N.Y.

[73] Assignee: Eastman Kodak Company, Rochester, N.Y.

[21] Appl. No.: 695,497

[22] Filed: Jan. 28, 1985

Related U.S. Patent Documents

Reissue of:

[64] Patent No.: 4,385,823
Issued: May 31, 1983
Appl. No.: 133,077
Filed: Mar. 24, 1980

U.S. Applications:

[63] Continuation-in-part of Ser. No. 30,668, Apr. 16, 1979, abandoned.

[51] Int. Cl.[4] ..... G03G 15/00

[52] U.S. Cl. ..... 355/3 R; 355/3 DD; 430/60; 430/107

[58] Field of Search ..... 355/3 R, 3 DD; 430/54, 430/60, 107, 110

[56] References Cited

U.S. PATENT DOCUMENTS

| | | | |
|---|---|---|---|
| 3,121,010 | 2/1964 | Johnson et al. | 430/54 |
| 3,234,017 | 2/1966 | Heyl et al. | 430/107 X |
| 3,337,339 | 8/1967 | Snelling | 355/3 R X |
| 3,932,034 | 1/1976 | Takahashi | 355/3 DD |
| 4,076,857 | 2/1978 | Kasper et al. | 430/103 |
| 4,081,571 | 3/1978 | Nishihama et al. | 355/3 DD X |

FOREIGN PATENT DOCUMENTS

| | | | |
|---|---|---|---|
| 1072557 | 6/1967 | United Kingdom | 430/56 |

*Primary Examiner*—Fred L. Braun
*Attorney, Agent, or Firm*—David F. Janci

[57] ABSTRACT

In a novel electrographic copying method and apparatus, a latent electrostatic image is formed on an insulating layer of an electrophotographic element and, before, during or after the formation of the latent electrostatic image, there is created a plurality of charge islands, such as by an exposure through a screen. These charge islands are distinct and in addition to any charge islands which result from the image-forming step. After establishment of the charge islands and the latent electrostatic image, the resulting charge pattern is developed with a developer which either is at least partially conductive, i.e., has a maximum resistance of about $10^9$ ohms, or is rendered so by the phenomenon of electrical breakdown.

15 Claims, 8 Drawing Figures

FIG. 1
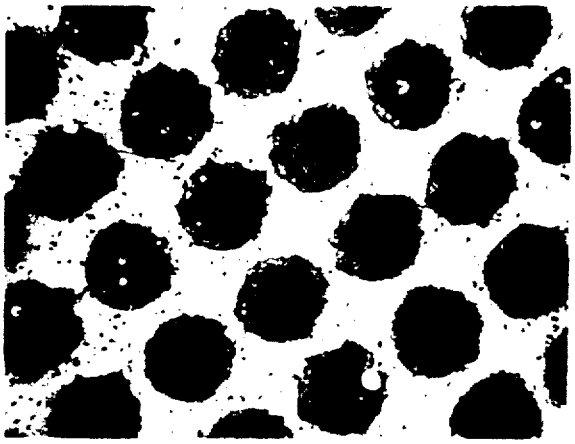
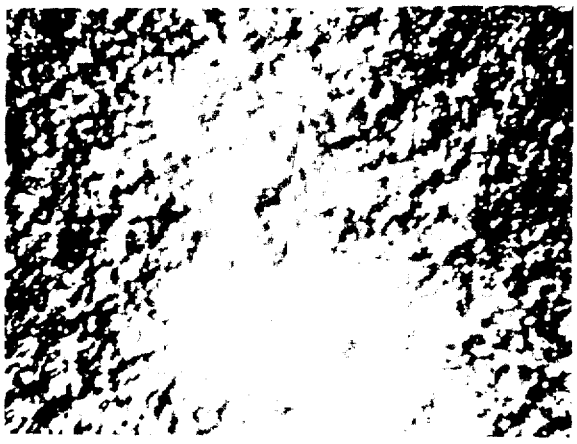
FIG. 2

EFFECT OF DEVELOPER CONDUCTIVITY ON SYSTEM H&D

FIG. 7
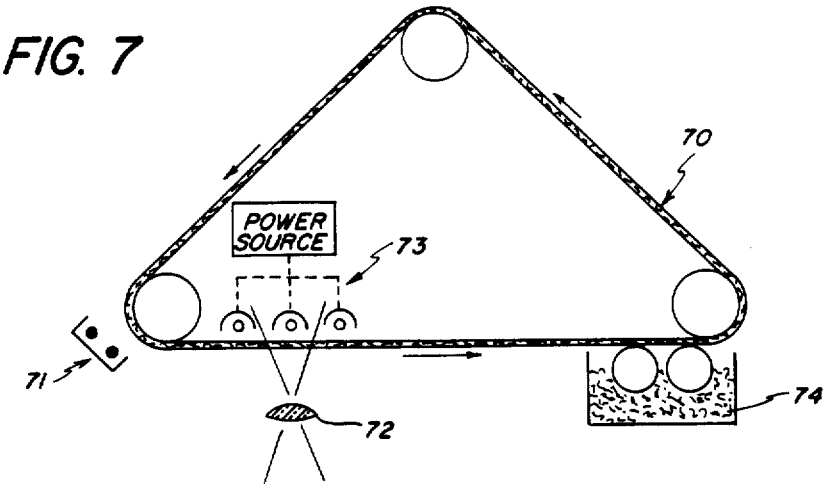
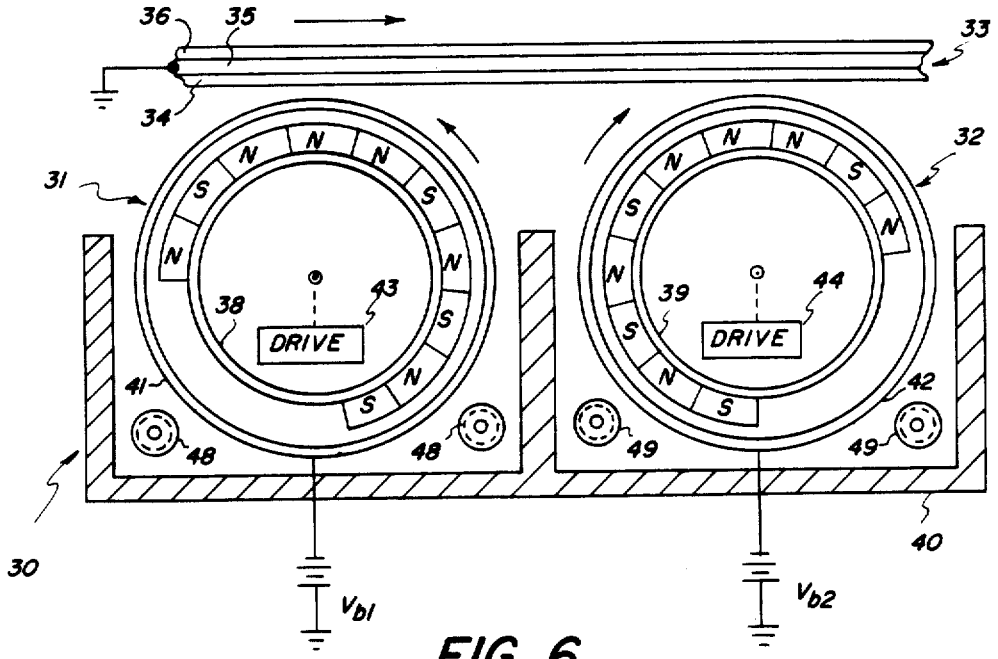
FIG. 6

METHOD AND MEANS FOR IMPROVING MAXIMUM DENSITY AND TONAL RANGE OF ELECTROGRAPHIC IMAGES

Matter enclosed in heavy brackets [ ] appears in the original patent but forms no part of this reissue specification; matter printed in italics indicates the additions made by reissue.

[This application is a continuation-in-part application of U.S. Ser. No. 030,668 filed Apr. 16, 1979, now abandoned, in the name of George P. Kasper et al.] *This application is a reissue application for U.S. Pat. No. 4,385,823, based on U.S. Ser. No. 133,077, filed Mar. 24, 1980, by George P. Kasper, Arthur S. Kroll and Michael Mosehauer which is a continuation-in-part of U.S. Ser. No. 30,668, filed Apr. 16, 1970, now abandoned.*

FIELD OF THE INVENTION

This invention relates to the production of electrographic images and particularly to an electrophotographic method and means for forming improved copies of continuous tone images.

DESCRIPTION OF THE PRIOR ART

Electrographic imaging methods commonly produce high contrast images. These methods are very useful for producing good line copy reproductions. However, such methods have not been particularly useful in reproducing continuous tone images, including continuous tone images with line copy and relatively large image areas of uniform density. Frequently adjunct means such as halftone screens, including halftone tint screens, are used to improve the reproduction of such difficult to reproduce images. Halftone tint screens have opaque dots of uniform density.

Typical screening techniques for producing half-tone copies of continuous tone images or of large image areas of uniform density generally involve transforming the image into a plurality of dots or lines which can then be developed. Such discrete charge bearing zones in the form of dots, lines or other subdivisions of such images hereinafter referred to as "charge islands", are separated by "open areas" bearing little or no charge relative to the charge islands. Electrostatic charge images comprising such charge islands can be created by initially charging the electrographic surface in a screen pattern, by masking the original image with a halftone screen during image exposure, or by uniformly exposing a charged photoconductive surface through a halftone screen before, during or after image exposure, but before development. A typical method is disclosed in U.S. Pat. No. 2,598,732.

Electrographic images that have been developed from charge patterns containing such "open areas" formed according to the above described prior art methods are found to also contain areas void of image forming particles or toner. These images have low maximum density. Consequently, densities of the original which are higher in magnitude than this low maximum density cannot be faithfully reproduced. Hence, the entire range of densities of the original is not faithfully reproduced. The range of densities of the original which can be faithfully reproduced is referred to hereinafter as the tonal range.

SUMMARY OF THE INVENTION

We have discovered an electrographic copying method for reproducing images having improved maximum density and tonal range which comprises:

(a) forming a latent electrostatic image on an insulating layer;

(b) before, during or after forming said image, creating a plurality of charge islands in the imaging area of said insulating layer in addition to any charge islands that result from the image forming step (a); and then (c) developing said image with a developer composition *comprising a toner and a carrier,* which *developer* is at least partially conductive.

Images reproduced according to the present invention have greater than expected maximum densities and greatly improved tonal ranges than images produced by prior art electrographic methods using screening techniques. Continuous tone images, including images having alphanumeric line copy and relatively large areas of uniform density, are reproduced with greater fidelity to the original than has been obtainable with such prior art electrographic methods.

In a preferred embodiment, the method of the present invention provides an electrophotographic copy method for reproducing continuous tone images having improved maximum density and tonal range which comprises:

(a) forming a latent electrostatic image of a continuous tone subject on a photoconductive layer;

(b) before, during or after forming said image, creating a plurality of charge islands in the imaging area of said photoconductive insulating layer in addition to any charge islands that result from the image forming step (a); and then (c) developing said image with a developer composition *comprising a toner and a carrier,* which *developer* is at least partially conductive.

In another preferred embodiment of the method of the present invention, a halftone screen is included as an integral part of the photoconductive element. This embodiment of the invention offers several advantages including (1) minimizing registration problems and use of simple continuous exposure techniques since the screen moves with the photoconductive layer, (2) a fixed space is maintained between the screen pattern and the photoconductive layer and (3) high frequency screen patterns may be used without significant resolution loss.

In another aspect the present invention provides a novel electrographic apparatus, including an electrophotographic apparatus, which is capable of carrying out the method of the invention. The apparatus includes an imaging member having an image recording area and means for forming an electrostatic image on said area, the improvement which comprises means for forming on said area, before, during or after forming said image on said area, a plurality of charge islands in addition to any such islands already present, and development means including a supply of a conductive developer for applying such developer to the resulting electrostatic image.

DESCRIPTION OF THE DRAWINGS

FIG. 1 is a photomicrograph of an electrostatic image developed with a non-conductive developer.

FIG. 2 is a photomicrograph of images developed according to the electrophotographic method of the present invention.

FIG. 6 is a drawing of an apparatus used in a preferred development method of the invention.

FIG. 7 is a schematic drawing of image forming stations of an electrographic apparatus or duplicator adapted to carry out the method of the present invention.

DETAILED DESCRIPTION OF THE INVENTION

As stated above the present invention provides a method for improving the maximum density and tonal range of electrostatic images formed using screening techniques. The means by which these improvements are achieved as well as the general and preferred examples of imaging members, image forming methods, developers and development methods will now be described.

To better understand the unexpected nature of the present invention attention is directed to FIGS. 1 and 2. Both FIGS. 1 and 2 are based on Example 8. The same screen and the same imaging conditions were used to produce the latent electrostatic images of both FIGS. 1 and 2. However, FIG. 2 was developed according to the method of the present invention while FIG. 1 was developed with a non-conductive liquid developer. In FIG. 1, the liquid developed charge islands are discrete and faithfully retain the size and shape of the transparent areas of the halftone tint screen used. In FIG. 2 however, the developed charge islands do not retain the dimensions of the transparent areas of the halftone screen. The developed charge islands of FIG. 2 appear to have expanded, making the open spaces between the islands smaller. It is thought that the expansion of the charge islands with the toners of a conducting developer causes the maximum density of the image to be increased. The maximum density obtained with the present invention is more than three times the expected density. This effect, referred to herein as dot enlargement, is entirely unexpected. Moreover, the use of a conducting developer also improves the tonal range of images reproduced by the method of this invention.

The present invention will be described and illustrated with an electrophotographic method using an insulating support which is photoconductive. However, as will be made clear hereinafter, the present invention is broadly applicable to any electrographic imaging method which produces modulated latent electrostatic images, e.g., latent electrostatic images having varying charge levels between Dmin and Dmax.

Figure 3:
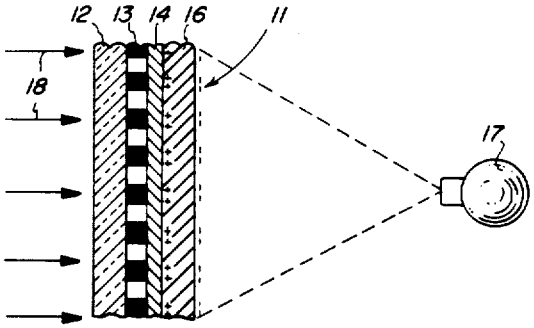
FIG. 3 is a drawing of a photoconductive element having a photoconductive layer and an integral halftone screen.

FIG. 3 illustrates a preferred embodiment of the present invention in which a means for forming charge islands is included in the photoconductive element. The photoconductive element 11 consists of a transparent support 12. The support provides mechanical strength to the other members of the element and makes it suitable for use in electrophotographic copying machines.

The support may be fabricated of almost any transparent material, either conductive or insulating, and may be selected from such diverse materials as glass and plastics of various types. The support may be rigid as in the case of a plate or cylinder of glass or polymethylmethacrylate or may be flexible as with the case of a plastic web, such as polyethylene, polyethylene terephthalate or the like. Although a transparent support is used in this illustrative embodiment of the invention, other types of support can be used, especially in circumstances where the photoconductive layer is exposed other than through the support.

Immediately adjacent to the support 12 is a halftone screen 13 made up of a number of finely divided, alternating, opaque and transparent areas. This screen is used to form the charge islands on the photoconductive layer. The screen pattern of opaque and transparent areas may be a conventional dot pattern or line pattern of the type used for the fabrication of halftone plates for newspaper printing. The alternating opaque and transparent areas of the screen pattern may be of almost any shape, including round dots, elliptical dots, lines and the like. The spacings of the pattern may also vary so that the pattern is regular, irregular, or random. The pattern may also be varied in size from dot-to-dot or line-to-line. Since the screen pattern is utilized only for forming charge islands, the screen may be either electrically conducting or insulating. To minimize moire patterns when copying images that already contain conventionally oriented 45° black and white halftone patterns, the halftone screen should be oriented such that after uniform exposure through the film belt, the resultant halftone pattern is at an angle of from 30° to 10° from the latent image halftone pattern of the original halftone being copied.

When halftone screens are used, the screen may have almost any frequency. The halftone screen may be located in the film base as disclosed in U.S. Pat. Nos. 3,310,401 and 3,335,003; it can be integral with the conductive layer as disclosed in Canadian Pat. No. 577,137 and German Pat. No. 1,572,374; in the barrier layer as disclosed in U.S. Pat. No. 3,341,326; as an overcoat over the photoconductive layer as disclosed in U.S. Pat. No. 3,627,526 and Canadian Pat. No. 906,802 or integral with the photoconductive layer as disclosed in U.S. Pat. No. 3,681,071, or French Pat. No. 1,373,910. Methods for producing electrophotographic images using screen techniques are well known. Such methods are disclosed in the aforementioned U.S. patents. Particularly useful results are obtained with halftone tint screens having a frequency of about 32 to about 80 dots/cm and a percent tint i.e. percent opaque areas of about 10 to 90%.

Although a halftone screen is used in this illustrative embodiment to form charge islands in the electrostatic image other means can be used for this purpose. For example charge islands can be formed by corona charging or discharge through a screen such as a grid-controlled charging screen or insulator screen or pulsed corona charge through a longitudinal screen as disclosed in U.S. Pat. No. 3,449,568; by charging with a patterned array of pulsed styli or wires as disclosed in U.S. Pat. No. 2,932,742; by discharging the photoconductive layer with a textured conducting roller as disclosed in U.S. Pat. No. 3,248,216; by or discharging via a voltage contrast patterned layer beneath the photoconductive layer as disclosed in U.S. Pat. No. 3,341,326.

Latent electrostatic images composed of charge islands according to the present invention may also be formed with a single exposure by using a scanning type exposure device such as a computer addressed light emitting diode array, cathode ray tube or laser. The continuous tone image may be momentarily or permanently stored in binary form in a computer memory. When it is desired to reproduce the continuous tone image, the proper output transducer circuits between the computer's memory and the exposure means are engaged. The computer's logic controls the transducer circuits in a way to cause the cathode ray tube, laser or light emitting diode array to modulate and/or pulse on and off according to the tonal range of the continuous tone image, while scanning, and thus, exposing a photoconductive element. This exposure of the photoconductive element results in a latent electrostatic image comprising charge islands of varying charge levels. Method and means for accomplishing a latent image comprising charge islands of varying charge intensity with scanning devices are disclosed in U.S. Pat. No. 3,864,697 (laser) granted Feb. 4, 1975 to Dillon et al; U.S. Pat. No. 4,025,189 (light emitting diode array) granted May 24, 1977 to Pugsley et al; and U.S. Pat. No. 3,681,777 (cathode ray tube) granted Aug. 1, 1972 to Smura et al. Each of these patents are hereby expressly incorporated herein by reference.

Immediately adjacent to the halftone screen 13 is a very thin transparent conductive layer 14 which may, for example, be composed of tin oxide, nickel, cermet, or copper iodide. Methods for forming such conductive layers are well known. Conductive layers are fully described for example in U.S. Pat. No. 2,429,420 to McMaster, U.S. Pat. No. 2,769,778 to Preston, U.S. Pat. No. 2,772,190 to Haayman, and U.S. Pat. No. 2,756,165 to Lyon.

Optionally an electrical or chemical barrier layer may be used in combination with the conducting layer 14 and the halftone screen 13.

The photoconductive layer 16 may be composed of any of the photoconductive insulating materials generally used in electrophotography, and may include such diverse materials as vitreous selenium, aggregate photoconductive layers of the type disclosed in U.S. Pat. No. 3,615,414 to Light or any one of many other organic photoconductor layers including multi-layer photoconductive structures having separate charge generating and charge transport functions. In general, any photoconductive layer or element will be useful in the present invention.

In one mode of operation according to the present invention, the photoconductive element is first charged with any one of the conventional electrophotographic charging means such as corona charging from a wire filament array as described in U.S. Pat. No. 2,588,699 to Carlson. This process is carried out in darkness so that after it is completed the photoconductive layer of the element has been sensitized with a generally uniform field.

During the image exposure step photoconductive layer 16 of the element is exposed to an original continuous tone image by projector means 17 thereby forming on said layer 16, a latent electrostatic image of the original. Formation of the plurality of charge islands within the latent electrostatic image is effected in this mode by a second uniform exposure through the rear of the element, and thus through the halftone screen 13. The rear exposure is carried out prior to, simultaneous with, or after image exposure of the photoconductor, the only requirement being that this rear exposure be carried out after the charging step and prior to the development step. This uniform exposure step is illustrated by arrow 18 in FIG. 3.

The uniform rear exposure of the charged photoconductive layer through screen 13 serves to at least partially discharge all areas of the photoconductive layer 16 directly opposite transparent areas of the screen. This exposure thus forms a plurality of very small charge islands of photoconductive layer 16. The amount of exposure used to form these charge islands will vary according to a variety of factors, including the nature of the photoconductive layer, type of developer, and mode of development.

The number and size of these small charge islands will depend directly upon the frequency and percent tint of the halftone screen used. Assuming rear exposure through the screen after image exposure, the small charge islands opposite white areas of the original image being copied are substantially completely discharged by the exposure to the original. Charge islands on the plate opposite grays in the subject are partially discharged. And charge islands opposite blacks in the original retain their original charge level.

If rear exposure is made after charging but prior to front image exposure, the charge islands are formed first and then modulated by the image exposure to the front of the element. If both front and rear exposures are made simultaneously, modulated charged islands are formed simultaneously. If the image exposure is made prior to the rear exposure, the level of charge across the whole plate is first modulated according to the light received from the image exposure to the subject. The resulting latent electrostatic image is then divided into charge islands by the subsequent rear exposure through the halftone screen. Regardless of which sequence is employed, the resulting charge pattern on the element is modulated by the uniform exposure through the halftone screen.

In the above described method and means for forming latent electrostatic images comprising a plurality of charge islands a photoconductive surface was used. However, such images could be formed by other means on a dielectric surface. The original image could be received from a computer or other data source and recorded by computer addressed styli on a dielectric surface. An example of this type of image recording is described in U.S. Pat. No. 3,045,644.

After formation of a latent electrostatic image comprising a plurality of charge islands the image is contacted with a developer which is at least partially conducting. To be at least partially conducting, the maximum developer resistance should be about $10^9$ ohms ($\Omega$), or the developer can be made at least partially conductive through the phenomena of electrical breakdown. Preferred maximum resistance is about $10^6\Omega$.

Resistance was measured using a General Radio DC electrometer type 1230-A, 6–9 Volts (or comparable equipment) in accordance with the following procedure. For each measurement, a 15 gram quantity of developer material uas used. A cylindrical bar magnet (560 Gauss North Pole) having a circular end of about 6.25 sq. cm. was used to attract the developer and hold it in the form of a brush. After formation of the brush, the bar magnet was positioned with the brush carrying end approximately parallel to and about 0.5 cm. from a burnished copper plate. The resistance of the particles in the magnetic brush was then measured between the magnet and the copper plate under general room conditions (about 70° F. and 40% humidity).

Typical conductive developers will comprise a toner and a carrier. The carrier may be conductive. Or a conductive additive may be added to improve the conductivity of the developer, as in U.S. Pat. No. 2,919,247. Typical conductive compositions include carriers such as iron, cobaltic oxide, stannic oxide, zinc and ferromagnesium, cupric carbonate, zinc carbonate, manganese carbonate, cupric oxide, lead acetate, zirconium, and nickel carbonate. [Single component conducting developers may work.] Other useful developer compositions are disclosed, for example, in U.S. Pat. No. 3,764,477 granted Oct. 23, 1973 to McCabe et al; U.S. Pat. No. 2,811,465; U.S. Pat. No. 2,904,000; U.S. Pat. No. 3,040,704; U.S. Pat. No. 3,098,765; U.S. Pat. No. 3,117,884; U.S. Pat. No. 3,246,629; U.S. Pat. No. 3,358,637; U.S. Pat. No. 3,402,698; U.S. Pat. No. 3,626,898; U.S. Pat. No. 3,640,248; U.S. Pat. No. 3,654,902; U.S. Pat. No. 3,665,891; U.S. Pat. No. 3,674,532 and U.S. Pat. No. 3,703,395.

Many developers having a resistance higher than about $10^9\Omega$ can be made at least partially conducting. Under controlled conditions, certain developer materials will undergo a phenomenon described as electrical breakdown. This phenomenon is described in U.S. Pat. No. 4,076,857 to Kasper et al on Feb. 28, 1978. U.S. Pat. No. 4,076,857 is incorporated herein by reference.

This breakdown phenomenon exhibited by developers manifests itself when measuring the resistance of the developer material as a function of the electrical field across the developer. The resistance is conveniently measured by (1) placing a metal electrode in the plane of the photoconductive element above an operating magnetic brush, (2) applying a known potential to the electrode, and (3) measuring the current passing through the magnetic brush. Resistance is calculated by dividing the voltage by the current.

At a certain level of the applied field, called the electrical breakdown value, for a small increase in field there is a large drop in the resistance of the developer material. The developer then acts as though it has a very low resistance. The breakdown value should be measured in the given process configuration under dynamic operating conditions (i.e., actual magnet configuration, actual toner concentration, relative humidity, support-brush spacing, support pressure on the developer, brush rpm. etc.) such as disclosed in U.S. Pat. No. 4,076,857.

Development by using the above-described electrical breakdown phenomenon can be carried out by (a) contacting a latent electrostatic image with a developer composition and (b) establishing across such developer an electrical field greater than the electrical breakdown value of the developer, thereby causing the developer to undergo electrical breakdown.

Development by the electrical breakdown mode can be influenced by a number of factors such as: the composition of the carrier particles; the concentration of toner particles in the developer; the strength of the electric field between the surface bearing the electrostatic charge pattern and the biasing electrode; and the thickness of the developer (i.e., the distance between the surface bearing the electrostatic charge pattern and the biasing electrode); initial photoconductor charge or charge on the support; bias voltage on the biasing electrode and varying the photoconductor thickness to alter surface potential per unit charge. Development is accomplished by selecting one or more of the aforementioned factors such that the electric field which forms across the developer during development is greater than the breakdown value of the developer material under the conditions of development.

The required field strength, in order to develop in the breakdown mode, can be obtained by properly selecting the development system parameters as discussed hereinabove. It is readily apparent, however, that physical limitations may prevent the designing of a development system which will enable field strengths to exceed the breakdown value for some particular developer compositions. Therefore, preferred developer compositions are those which have relatively low breakdown values. Less than 25 volts/mm is typical.

Also, in order to prevent discharging of the latent electrostatic image, preferred developer compositions are those which exhibit relatively high resistivity prior to breakdown, i.e., when subjected to a low strength electric field. A low field resistivity of at least $10^5$ ohm-cm is preferred. By the terms "low field resistivity" and "measured under low fields" as used herein, we mean resistance measurements made in accordance with the procedure previously described.

Instead of forming the charge islands and developing the latent electrostatic image on the photoconductive layer as described above, the image could be transferred to another insulating support and developed as above.

Figure 8:
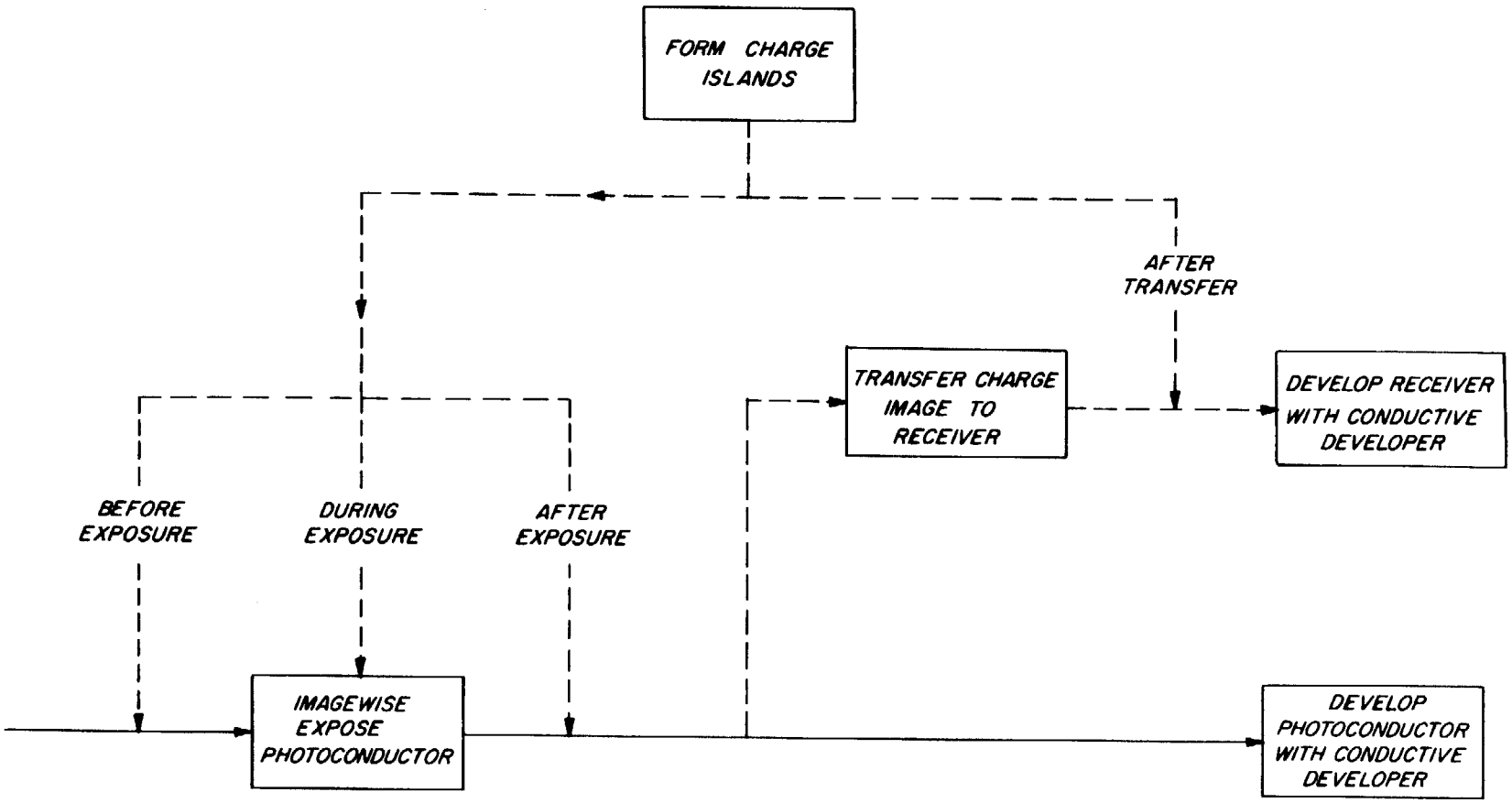
FIG. 8 is a schematic flow diagram indicating alternative ways in which charge islands can be formed either on a photoconductor element or on an insulated receiving element.

FIG. 8 illustrates the transfer of the charge image and various alternative points in the process for forming the charge islands.

(The sequence of steps illustrated by FIG. 8 proceeds from left to right. The formation of charge islands, as shown in FIG. 8, can take place at any one of the indicated points in time of the overall process depicted; that is, charge islands can be formed before exposure or during exposure or after exposure, or they can be formed on a receiver element after transfer of the charge image to such receiver. FIG. 8 also indicates the alternative of transferring the charge image to a receiver in lieu of leaving the charge image on the original photoconductor for development in accordance with the invention.) The transfer can be made before or after the charge islands are formed in the image. In general, any of the methods for electrostatic image transfer described in the prior art will be useful. Representative useful methods for the transfer of electrostatic images (TESI) are disclosed in Electrophotography by R. M. Schaffert (1975) Focal Press, pages 167–176. If the image is transferred before the charge islands are formed, the charge islands may be formed on the insulated receiving element before, during or after the transfer. The techniques for forming the charge islands include many of the same methods described previously for formation of charge islands on photoconductive layers. Development is carried out on the transferred image in the same manner as described for development on photoconductive layers.

Development with conducting developers or via the electrical breakdown mode may be carried out utilizing any one of the conventional electrographic developing means such as cascade as described in for example U.S. Pat. No. 2,725,304 to Landrigan, or magnetic brush as for example disclosed in U.S. Pat. No. 2,874,063 or U.K. Patent specification No. 1,355,485.

A particularly useful magnetic brush technique is described in co-pending commonly assigned U.S. Patent Application Ser. No. 027,115 filed by Kroll et al on Apr. 4, 1979, now U.S. Pat. No. 4,292,921. This application discloses an improved electrographic development method for use with partially-conductive developers. The method comprises (1) moving an electrostatic image bearing member past a development zone and (2) transporting such developer (a) through a first development zone in a direction generally countercurrent to the moving image member and (b) through a second development zone in the same direction as the moving image member. The extent of image development within each such zone is controlled by the rate of developer transport and/or the magnitude of developer bias, so that overall development of the different portions of solid image areas (particularly leading and trailing portions of such areas) is equalized.

One structural embodiment for practice of this development procedure is disclosed in FIG. 6. The development apparatus 30 there illustrated comprises two magnetic brushes 31, 32 mounted at a development station along the path of an electrographic image member 33. The image member can be of various types known in the art, e.g., including a photoconductive insulating layer 34, an electrically conductive backing layer 35 and a film support 36. Each of magnetic brushes 31, 32 respectively comprises an array of strip magnets, denoted N and S, arranged as shown around the periphery of inner cores 38 and 39, which are stationary within developer reservoir 40. Each brush also includes an electrically conductive outer cylinder 41 and 42 respectively, which is non-magnetic and rotatable around the core to transport developer mixture, attracted by the magnets N and S, from the reservoir 40 into contact with the image member 33 and back into the reservoir to be replenished. To facilitate uniform distribution of developer longitudinally across the brush surface, augers 48, 49 can be provided in the reservoir as shown. Preferably, the augers have a pitch which varies longitudinally to equalize the quantity of developer supplied. It is to be noted that the cylinders 41 and 42 of brushes 31 and 32 are rotated in different directions, as indicated, by drive means 43, 44 respectively, and that each cylinder has a separate electrical bias from respective potential sources $Vb_1$ and $Vb_2$.

In operation the image member 33 is moved as shown across the development apparatus as the magnetic brushes 31 and 32 are rotated in the directions described and shown.

Known electrographic apparatus, including electrophotographic apparatus, which include an imaging member having an image recording area and means for forming an electrostatic image on said area can be adapted to perform the method of the present invention. Such apparatus can be modified to also include means for forming, in the image recording areas of the imaging member, a plurality of charge islands and development means which includes a supply of conductive developer for applying the developer to the resulting electrostatic image. Image forming stations of a representative electrographic apparatus are presented schematically in FIG. 7. The electrographic apparatus, as presented, comprises a photoconductive imaging member 70 which includes the halftone screen described in FIG. 3. The apparatus also includes charging means 71, imaging exposure means 72, means 73 for uniformly exposing the imaging area of the photoconductive layer through the halftone screen included in the photoconductive imaging member 70. As shown, the uniform exposure can be made before, during or after formation of an electrostatic image. Finally, the figure shows development means 74 which includes a conductive developer composition as required by the present invention. Examples of apparatus which can be adapted for use herein include U.S. Pat. Nos. 3,876,106; 3,877,413; 3,535,036 and 3,203,394.

It is of course, readily apparent that the method of the present invention can be used to form both monochrome and polychrome images. Suitable colorants can be incorporated into toners according to known methods to render electrostatic images toned therewith colored. The colorants useful in suitable toners are preferably dyestuffs and pigments. In principle, virtually all of the compounds mentioned in the Color Index, Vols. I and II, second edition, 1956, can be used as colorants. Included among the vast number of suitable colorants would be such materials as carbon black, Nigrosine Spirit soluble (C.I. 50415), Hansa Yellow G (C.I. 11680), Chromogen Black ETOO (C.I. 14645), Rhodamine B (C.I. 45170), Solvent Black 3 (C.I. 26150), Fuchsin N (C.I. 42510), C.I. Basic Blue 9 (C.I. 52015), etc.

The unexpected results obtained with the method of this invention, are further illustrated by the following examples.

EXAMPLE 1

An aggregate photoconductive element of the type described in Example 1 of U.S. Pat. No. 3,615,414 granted to Light, Oct. 26, 1971, was charged and imagewise exposed to a step tablet having neutral density areas of 0.09, 0.41, 0.75 and 1.05.

The element was given a second uniform exposure from the front side through a halftone screen having a frequency of 60 dots/cm, and a percent tint of 50. This screen has opaque dots of uniform density over 50 percent of its area. The screened latent image was then developed with a magnetic brush and a developer composition described in detail in Examples 4–8. The resistance of the developer was $1.5\times10^6\ \Omega$ measured as described hereinbefore. Developer resistances can be varied by controlling the degree of oxidation of metal carrier cores.

The reflection densities of the developed image of the step tablet were compared graphically with the expected densities resulting from the use of a 50 percent tint screen. The expected densities were calculated assuming that the dots on each step of the step tablet were faithfully reproduced. The calculation was carried out in the following manner.

The density (D) of a particular image area is given by the formula $$D=\log 1/R$$

R represents reflectance. To a first approximation reflectances are additive when viewed at a normal viewing distance. Hence, the total reflectance ($R_t$) of an area of several densities is given by $$R_t=X_1R_1+X_2R_2+X_3R_3--+X_nR_n$$

in which $X_n$ is the fraction of the total area covered by reflectance $R_n$.

It is assumed that the developed density on a given dot for a specific voltage is the same as the developed density would be for that same voltage in a large solid area. The solid area output density (copy) as a function of input density (original) can be experimentally determined. Hence the expected output density for a halftone screen having a known percent dot area, can be calculated. For example:

Din (density input) of 1.0, for large solid areas results experimentally in Dout (density output) of 1.4 on a paper base of 0.1 density. Then for a halftone tint screen of 50 percent X=0.5 and:

$$D = \log \frac{1}{R} \text{ or } R_1 = \frac{1}{\log^{-1}(D_1)}; R_2 = \frac{1}{\log^{-1}(D_2)}$$

$D_1$ represents the density of the solid area. $D_2$ represents the density of the paper base.

$$R_1 = \frac{1}{\log^{-1}(1.4)} = 0.0398$$

$$R_2 = \frac{1}{\log^{-1}(0.1)} = 0.7943$$

Therefore the total expected density ($D_t$) is:

$$D_t = \log\left[\frac{1}{X_1R_1 + X_2R_2}\right]$$

$$= \log\left[\frac{1}{.5(.0398) + .5(.7943)}\right]$$

$$= 0.38.$$

The calculation is then repeated for different Dout levels as found by developing in the absence of a halftone screen.

Figure 4:
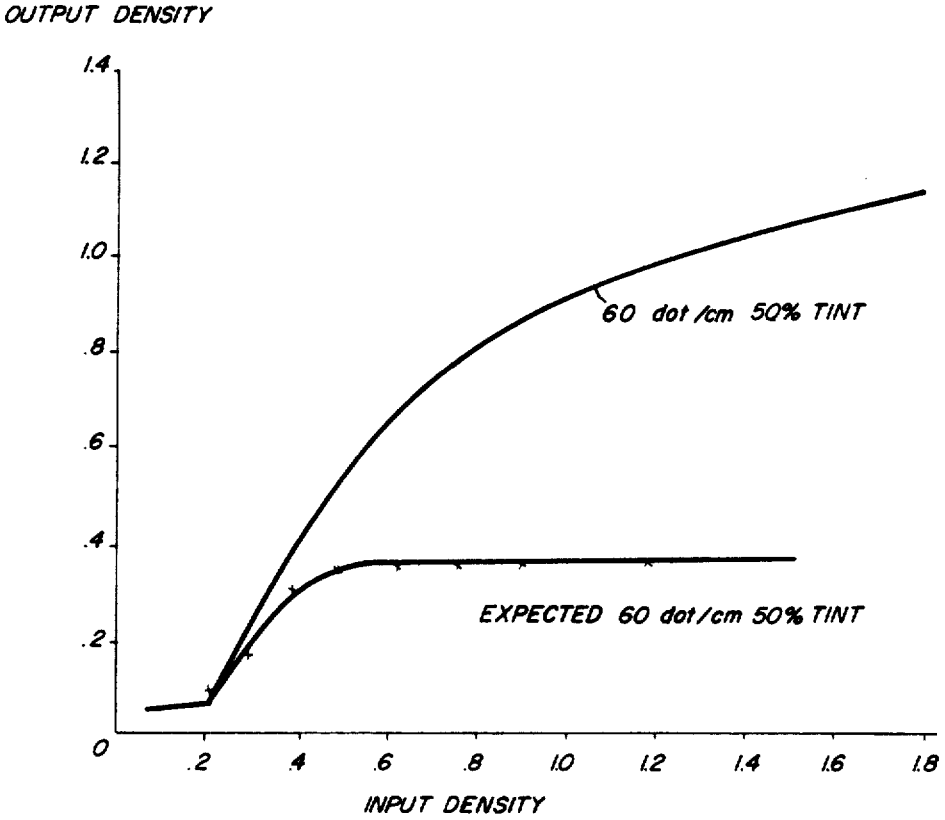
FIGS. 4 and 5 are graphic representations of the results of examples 1 and 2.

The graphic comparison of the actual reflection densities and the expected densities is shown in FIG. 4. The graph of FIG. 4 shows that the expected Dmax (0.38) is about ⅓ of the actual output Dmax (1.2). The tonal range of this example is also greater than that expected as can also be seen from the graph. More steps of the step tablet were faithfully reproduced than expected.

EXAMPLE 2

To further illustrate the unexpected improvement in maximum density and tonal range obtained in Example 1, prints were made as in Example 1 with two different developers: a dry partially conductive developer, with a resistance of $1.5\times10^6\Omega$, and a developer with a resistance of $4.4\times10^9\Omega$.

Figure 5:
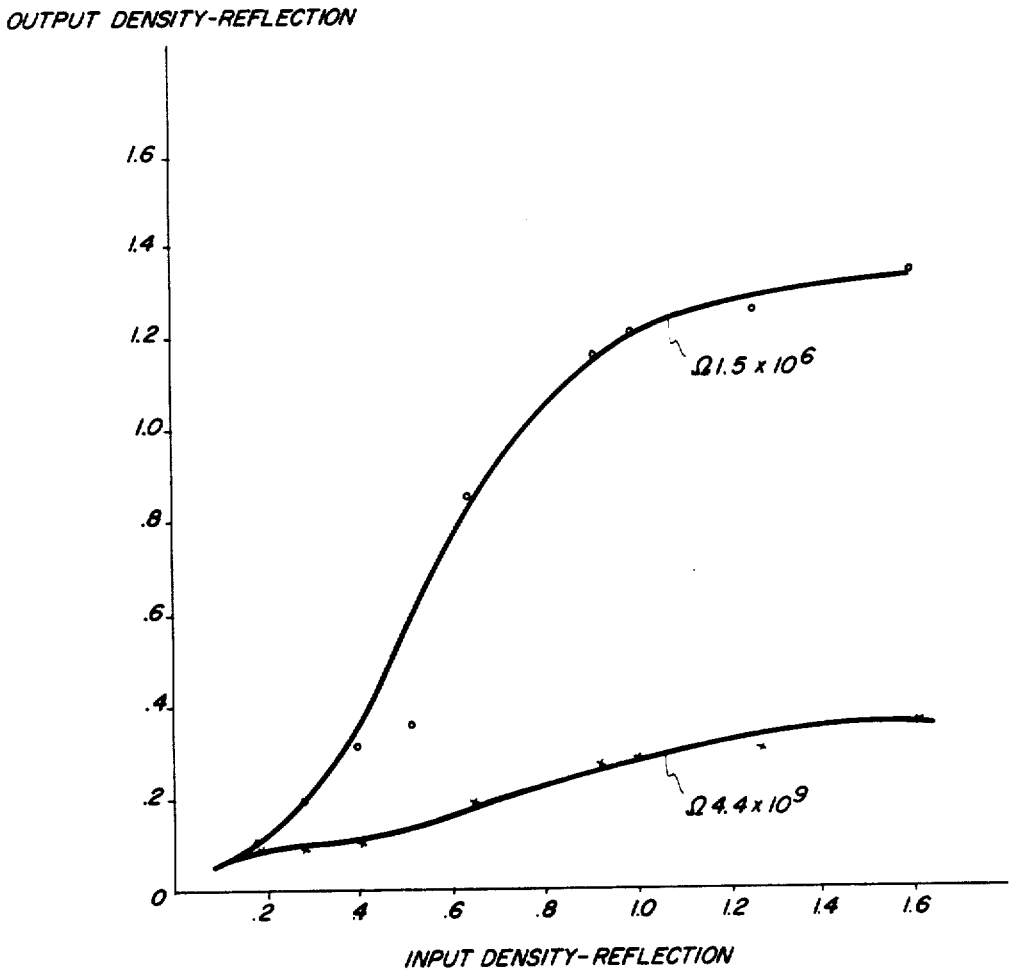

In FIG. 5, the input density versus output density of each developed image is shown. Dmax for the image developed with the more conducting developer is much higher than Dmax for the image developed with the more resistant developer. Also, the tonal range of the former is much greater than that of the latter.

EXAMPLE 3

Five halftone tint screens having a frequency of 33.5 dots/cm and tints of 67%, 52%, 42%, 40% and 30% respectively were prepared from 20 cm×25 cm sheets of Kodalith® Film available from Eastman Kodak Company. Each of these screens was cemented to a transparent base photoconductor film to form 5 separate elements. The photoconductor layer was of the type disclosed in U.S. Pat. No. 3,615,414.

Each element was imaged substantially as in Example 1 except that the uniform screen exposure was from the rear of the film through the screen pattern. A reflection original document was used as a test with areas having neutral densities of 0.09, 0.41, 0.75 and 1.05 respectively. The prints were developed as in Example 1 with developer having a resistance of $1.5\times10^6\Omega$. Density measurements were made and plotted as in Example 2.

Observations

The prints showed smooth, uniform, neutral tones with very little mottle and edge defects. The graphs describing density input vs. density output showed high Dmax, lowered image contrast and extended tonal range as in Example 1.

EXAMPLES 4–8

These examples were designed to illustrate the effect of developer resistance on copy density.

The developers used in Examples 4–8 contained toner particles comprising carbon black in a styreneacrylate polymeric matrix and magnetic carrier particles coated with a vinylidene fluoride-fluoroethylene-copolymer. Various carrier particle cores were used (see list below) to produce developers exhibiting a range of resistances that were measured as previously described.

| Example | Carrier Core |
|---|---|
| 4 | stainless steel |
| 5, 6, 7 | EH oxidized iron (sold by Hoeganacs Co.) Carrier cores for Ex. 5, 6 and 7 were oxidized, as described in U.S. Pat. No. 3,767,477, to three different levels of oxidation to vary the developer resistance. |
| 8 | nickel plated EH iron (Hoeganacs Co.). |

In these examples an integral screen photoconductive element was prepared containing, in the following order: a transparent film support of poly(ethylene terephthalate), a magenta halftone dot screen of 60 dots/cm, 50% tint, printed by offset lithography onto the film support, an evaporated nickel conducting layer, and an aggregate photoconductive layer of the type described in U.S. Pat. No. 3,615,414.

Prints were made as in Example 3 with a reflection original document having neutral density area (referred to as input density of $D_{in}$) as indicated in Table 1.

The results were consistent with those obtained in previous examples. Output densities (copy) vs. input densities (original) are reported in Table 1 for each developer at a different conductivity. Expected densities were calculated as in Example 1. This data shows that developers having a resistance of about $10^9\ \Omega$ or less produce higher Dmax than expected.

To illustrate the dot enlargement effect of the invention, photomicrographs were taken of output density ($D_{out}$) neutral areas corresponding to $D_{in}$ values: 1.58; 0.78; 0.40 and 0.21 of the print made in Example 8. The dot enlargement effect was observed as increased toner fill-in between the halftone dots at a given $D_{in}$ as developer resistance decreased. For comparison, a photomicrograph is included of a halftone dot pattern on a photoconductive layer which has been developed with a non-conductive liquid developer. The photomicrograph corresponds to an area having a $D_{in}$ value of 1.58. FIG. 2 is a representative photomicrograph of the dot enlargement effect achieved in Examples 7 and 8. FIG. 1 is a photomicrograph of the results obtained with the non-conductive liquid developer composition. No dot enlargement can be observed in FIG. 1.

TABLE 1

| Step of Neutral Density Wedge | $D_{in}$ | $D_{out}$ Ex. 4 $>10^{10}\Omega$ | Ex. 5 $1.4 \times 10^{9}\Omega$ | Ex. 6 $1.4 \times 10^{8}\Omega$ | Ex. 7 $1.8 \times 10^{7}\Omega$ | Ex. 8 $1.2 \times 10^{6}\Omega$ | Expected |
|---|---|---|---|---|---|---|---|
| 1 | 1.58 | .22 | .60 | .69 | .95 | 1.32 | .38 |
| 2 | 1.12 | .20 | .53 | .60 | .88 | 1.26 | .38 |
| 3 | .87 | .19 | .44 | .52 | .75 | 1.20 | .37 |
| 4 | .78 | .17 | .42 | .49 | .65 | 1.08 | .37 |
| 5 | .53 | .13 | .30 | .36 | .38 | .60 | .36 |
| 6 | .40 | .11 | .20 | .25 | .24 | .34 | .32 |
| 7 | .30 | .10 | .13 | .16 | .19 | .19 | .19 |
| 8 | .21 | .08 | .08 | .08 | .10 | .08 | .10 |
| 9 | .14 | .07 | .06 | .06 | .07 | .05 | .10 |
| 10 | .09 | .06 | .06 | .06 | .06 | .05 | .10 |

EXAMPLE 9

This example illustrated the use of a developer that is made conductive by the breakdown development mode. The developer was similar to the developer described in Example 8 with the exception that the mean particle size of the toner was smaller (6.8 millimicrons). The toner concentration was 3.1%.

An integral screen photoconductive element was used similar to the element described in Examples 4–8 with the exception that the halftone screen had a frequency of 52 dots/cm. and a 40% tint.

The developer was run in a two roller magnetic brush development station for 1 hour to allow the developer to come to equilibrium.

In operation, the photoconductor film was charged to −500 volts, exposed such that the film voltage corresponding to a 0.15 neutral density grey scale step was −150 volts, uniformly rear exposed through the screen and developed in a breakdown development mode in a two roller magnetic brush development device with 7.6 cm diameter rollers operating at brush speeds of 160 and 180 RPM. The film velocity was 25 cm/second and the magnetic brush spacing from the film surface was 1.91 millimeters with a development brush bias of −140 volts. The breakdown value for this developer, as measured according to the procedure described in U.S. Pat. No. 4,076,857 was 13.6 volts per millimeter.

The resultant prints exhibited high $D_{max}$, smoothness and extended tonal scale.

The invention has been described in detail with particular reference to certain preferred embodiments thereof, but it will be understood that variations and modifications can be effected within the spirit and scope of the invention.

For example the present invention is useful in forming reversal images. Image tone reversal can be obtained by developing the discharged areas of the images, instead of the charge islands, with a highly biased magnetic brush and developing with a toner having the same polarity as the brush bias.

We claim:

1. An electrographic copying method for producing images having improved maximum density and tonal range comprising:
   (a) forming a latent electrostatic image on an insulating layer;
   (b) before, during or after forming said image, creating a plurality of charge islands in the imaging area of said insulating layer in addition to any charge islands that result from the image forming step (a); and then
   (c) developing said image with a developer composition *comprising a toner and a carrier, said developer* having a maximum resistance of about $10^9$ ohms.

2. A method as in claim 1, wherein the insulating support is an image receiving element.

3. An electrographic copying method for reproducing continuous tone images having improved maximum density and tonal range comprising:
   (a) forming a latent electrostatic image of a continuous tone subject on a photoconductive insulating layer;
   (b) before, during or after forming said image, creating a plurality of charge islands in the imaging area of said photoconductive layer in addition to any charge islands that result from the image forming step (a); and then
   (c) developing said image with a developer composition having a maximum resistance of about $10^9$ ohms.

4. An electrographic copying method for reproducing continuous tone images having improved maximum density and tonal range comprising:
   (a) forming a latent electrostatic image of a continuous tone subject on a photoconductive insulating layer;
   (b) before, during or after forming said image, uniformly exposing the photoconductive insulating layer through a halftone screen to create a plurality of charge islands on said layer in addition to any charge islands that result from the image forming step (a); and then
   (c) developing said image with a developer composition *comprising a toner and a carrier, said developer* having a maximum resistance of about $10^9$ ohms.

5. A method as in claims 1, 3 or 4 wherein said image is developed with a dry developer composition.

6. A method as in claims 1, 3 or 4 wherein said developer composition is applied to said image with a magnetic brush.

7. A method as in claims 1, 3 or 4, wherein said image is developed with a magnetic brush by
   (a) moving an electrostatic image bearing member past a development zone; and
   (b) transporting such developer
      (i) through a first development zone in a direction generally counter-current to the moving image member; and
      (ii) through a second development zone in the same direction as the moving image member.

8. A method as in claim 4, wherein the charge islands are formed by uniformly exposing the photoconductive insulating layer through a halftone screen which is located between a transparent support and the photoconductive layer.

9. A method as in claim 4 or 8, wherein the halftone screen is a halftone tint screen having a frequency of about 32 to about 80 dots/cm and a tint of about 10 to about 90%.

10. A method as in claim 3 or 4, wherein the latent electrostatic image and the charge island in the imaging areas of said photoconductive layer are created simultaneously by exposing said photoconductive insulating layer to a computer addressed scanning exposure device selected from the group consisting of light emitting diode arrays, cathode ray tubes and lasers.

11. A method as in claim 3 or 4, wherein said image is transferred to an image receiving element before development.

12. A method as in claim 11, wherein the charge island images are formed on said imaging receiving element after image transfer.

13. In an electrographic apparatus which includes an imaging member having an image recording area and means for forming an electrostatic image on said area, the improvement which comprises means for forming on said area, before, during or after forming said image on said area, a plurality of charge islands in addition to any such islands already present, and development means including a supply of a developer *comprising a toner and a carrier, said developer* having a maximum resistance of about $10^9$ ohms for applying such developer to the resulting electrostatic image.

14. In an electrographic apparatus which includes a photoconductive imaging member having an image recording area and means for forming an electrostatic image on said area, the improvement which comprises means for forming on said area, before, during or after forming said image on said area, a plurality of charge islands in addition to any such islands already present, and development means including a supply of a developer *comprising a toner and a carrier, said developer* having a maximum resistance of about $10^9$ ohms for applying such developer to the resulting electrostatic image.

15. In an electrographic apparatus which includes a photoconductive imaging member having an image recording area and means for forming an electrostatic image on said area, the improvement which comprises the inclusion of a halftone screen in the imaging member for forming on said area, before, during or after forming said image on said area, a plurality of charge islands in addition to any such islands already present, and development means including a supply of a developer *comprising a toner and a carrier, said developer* having a maximum resistance of about $10^9$ ohms for applying such developer to the resulting electrostatic image.

* * * * *